United States Patent [19]

Robinson

[11] 4,263,147

[45] Apr. 21, 1981

[54] TREATMENT PROCESS

[75] Inventor: Lee F. Robinson, London, England

[73] Assignee: RTL Contactor Holding S.A., Zug, Switzerland

[21] Appl. No.: 83,270

[22] Filed: Oct. 10, 1979

[30] Foreign Application Priority Data

Oct. 13, 1978 [GB] United Kingdom ............... 40436/78

[51] Int. Cl.³ .............................................. B01J 8/10
[52] U.S. Cl. .................................... 210/685; 210/189; 422/225
[58] Field of Search ...................... 210/33, 37, 38, 189; 422/269, 225

[56] References Cited

U.S. PATENT DOCUMENTS

| | | | |
|---|---|---|---|
| 2,697,724 | 12/1954 | Collier | 210/33 |
| 3,174,927 | 3/1965 | Cross et al. | 210/33 |
| 3,207,577 | 9/1965 | Mizuma | 210/33 |
| 3,649,209 | 3/1972 | Coleby | 422/269 |
| 4,028,234 | 6/1977 | Katzakian et al. | 210/37 R |

Primary Examiner—Ivars C. Cintins
Attorney, Agent, or Firm—Bernard & Brown

[57] ABSTRACT

A process for treatment of a liquid stream, optionally comprising solids such as minerals, comprises passing at least two different treating reagents through contactors each comprising a drum with a rotor having axially spaced discs compartmentalizing the drum interior and carrying receptacles which rotate with the rotor and cause transfer of portions of one phase in the contactor to the other phase as the rotor turns. The liquid stream being treated is caused to flow along a path including, in succession, parts of each contactor so that the liquid stream is brought into contact with the reagents successively and in rotation.

10 Claims, 2 Drawing Figures

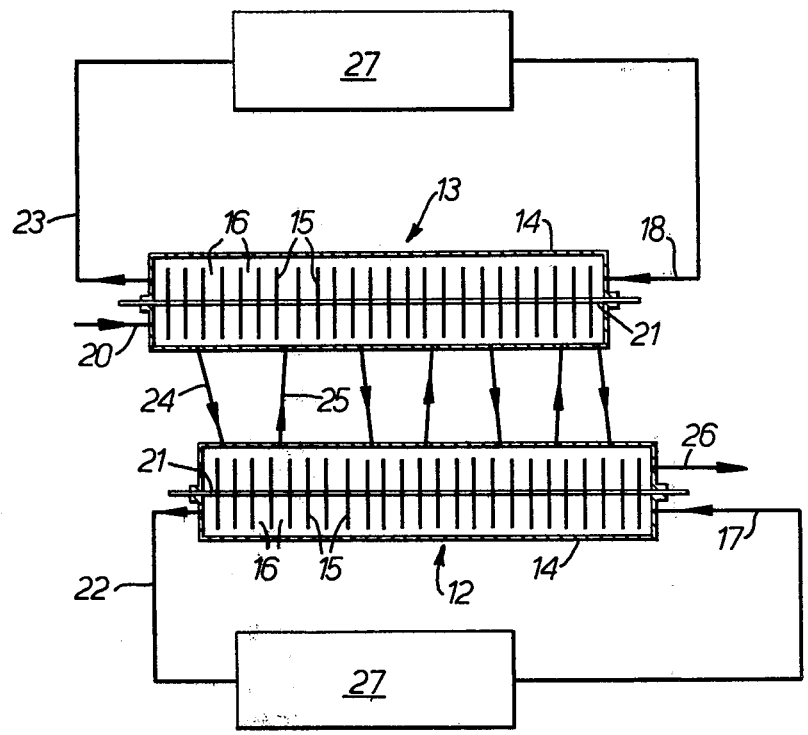
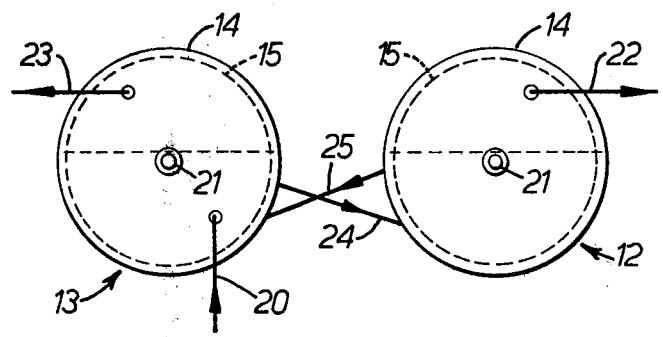

TREATMENT PROCESS

BACKGROUND OF THE INVENTION

This invention relates to a process for the treatment of a liquid stream with two different reagents. The invention is particularly concerned with, but is not limited to, the deionisation of a stream of liquid employing deionising agents and particularly deionising resins.

It is known to deionise liquid by passing the latter first through a bed of anionic deionising resin and subsequently through a bed of cationic deionising resin; in theory in that way salts can be removed from the liquid. In practice, it is found that the treatment of the liquid in two such beds is not wholly effective and that, instead, it is necessary to pass the liquid subsequently and alternately in contact with the two types of resin. Thus, it has been proposed to pass the liquid through a column containing alternate layers of anionic and cationic resins. While such a column may be effective in removing salts from the liquid, it has the attendant problem of subsequently separating the resins for regeneration.

OBJECTS OF THE INVENTION

It is an object of the present invention to provide a liquid treatment process using at least two reagents, in which the reagents are kept separate from one another.

It is a further object of the invention to provide a process for the desalting of a liquid stream optionally containing solids with an anionic deionising agent and a cationic deionising agent in which the deionising agents are independently contacted with the liquid stream.

These and other objects of the invention will appear from the following description and claims.

SUMMARY OF THE INVENTION

The invention makes use of a contactor which comprises a drum through which the phases pass, usually in countercurrent, a rotor within the drum including a plurality of axially spaced discs dividing the drum interior into a series of compartments, spaces being formed between the drum and the edges of the discs to allow passage of the phases from compartment to compartment, and, for each of at least some of the compartments, a plurality of receptacles arranged to rotate with the rotor and designed to receive material of one phase and to discharge it into the other phase as the rotor turns. The phases, which can be both liquid or which can comprise a liquid phase and a solids phase, pass through the drum and are brought into contact with one another in the compartments by virtue of the action of the rotating receptacles. Such a contactor is described in U.S. Pat. No. 3,649,209. A contactor as described above will be referred to in this specification as "a contactor of the type described".

One aspect of the present invention resides in a process for the treatment of a liquid stream in which at least two different reagents are respectively continually passed through at least a first and second contactor of the type described and the liquid stream is caused to flow along a path which includes succession parts of one of the contators and parts of the other contactor or contactors, so that the liquid stream is brought into contact with the reagents successively and in rotation. The liquid stream may be caused to follow that path by providing connections between selected compartments of one contactor and selected compartments of the other contactor or contactors. It will be understood that the liquid stream may contain solids carried therein.

Preferably the liquid stream is brought into contact successively and alternately with two reagents in respectively a first and second contactor.

When the invention is applied to the deionisation of a liquid stream, streams of anionic and cationic deionising agents are passed respectively through the two contactors so that the liquid is brought into contact with each as it passes through the respective contactor.

Preferably, the deionising reagents are in the form of particulate resins having a specific gravity less than that of the stream being treated. In that case, the liquid stream in each contactor flows in countercurrent to the resin streams, with the resin, preferably with the carrier liquid, occupying the upper part of each contactor and the liquid stream occupying the lower part. Alternatively, the deionising reagents may flow co-current with the liquid stream, in which case each resin may have a specific gravity greater than that of the liquid stream and occupy the lower part of each contactor.

BRIEF DESCRIPTION OF THE DRAWINGS

FIG. 1 is a schematic plan view of an apparatus for performing the process of the invention, FIG. 2 is a schematic front end view of the apparatus of FIG. 1.

DESCRIPTION OF THE PREFERRED EMBODIMENTS

The apparatus for performing the process consists essentially of two contactors of the type described in U.S. Pat. No. 3,649,209, arranged with their axes parallel and at an inclination to the horizontal of the order of 7°. The contators are shown schematically in the drawing at 12 and 13, each being represented merely by its stationary drum 14 and the discs 15 which are mounted on the rotor 21 and which divide the respective contactor into a series of compartments 16.

Into contactor 12 is introduced a stream 17 of anionic deionising resin particles in a non-polar carrier liquid, e.g. kerosene. The stream leaves the contactor on line 22. Similarly, a stream 18 of cationic deionising resin particles in a similar carrier liquid is caused to pass through the contactor 13 in the same direction. The stream leaves the contactor on line 23. A stream 20 of liquid to be treated, containing a salt or salts to be removed is introduced into contactor 13 in countercurrent to the resin stream 18 and passes through a number of the compartments 16, being there contacted by the cationic resin; the resin and its carrier liquid being lighter occupies the upper half of the contactor, while the treatment liquid 20 occupies the lower half.

After the treatment liquid 20 has traversed a selected number of compartments 16 in the contactor 13, it is caused to leave the contactor and enter the other contactor 12. This is done by having an opening in the wall of the drum 14 below the centre line of the drum and connecting by piping 24 to a similar opening in the drum of the other contactor 12. The stream 20 next passes through a section consisting of a number of compartments of contactor 12 before returning to contactor 13 by a second pipe 25 connecting the two drums. The stream then passes in a similar manner repeatedly between the two contactors as indicated in the drawing so that it is contacted alternately by the two resin streams 17 and 18. Finally the stream exits from contactor 12 on line 26 at the end at which the anionic resin stream 17 enters.

It is important that the resin of one contactor should not be transferred to the other contactor and intermingle with the resin of that other contactor. Locating the openings in the drum walls at levels below the interfaces between the resin streams 17, 18 and the treatment stream 20 results in there being little possibility of resin being carried out of the respective contactor with the stream 20, but in addition each opening in the drum wall is provided with a mesh with a fineness preventing passage of the resin particles.

The contactor drums are interconnected by the piping in such manner that, bearing in mind the inclination of the drum axes, the level at which the liquid leaves one contactor is above the level at which it enters the other contactor; that arrangement increases the proper flow of the liquid from one contactor into the other. It will be appreciated that only a part of the stream 20 will flow through the piping interconnecting the contactors, the remainder continuing through the contactor in contact with the resin. If desired, each contactor can be formed into separate sections by means of rotary seals surrounding the lower parts of selected discs 15, in order to ensure that the entire flow is transferred from one contactor to the other.

Because the two streams 17 and 18 of the resins are kept entirely separate in the respective contactors 12 and 13, the need to separate the resins does not arise and each stream on leaving the respective contactor is immediately treated in a regeneration unit 27 to regenerate the resin and to return it to the entry of the contactor. This means that resins of identical physical specifications can be used in the two contactors with no separation problems.

The resins can be used in the invention in a non-aqueous phase lighter than the liquid stream being treated. Thus solid material, such as minerals in the liquid stream will not interfere with the resin as is the case in a conventional resin bed where minerals may cause blocking. Alternatively the resin may be carried in an aqueous medium underlying an organic phase.

The invention is applicable to two-phase treatment processes, where an entirely liquid stream is treated, for example in the desalting of salt water, beverages (such as freeze-concentrated alcohol) and monomer solutions of comparatively high density prior to polymerisation.

The invention is also applicable to three-phase processes where the liquid stream contains a solid. Thus, for example, the invention can be used in the desalting of minerals such as kaolin (where the salt content has a substantial effect on the properties of the product). The invention may also be used for desalting solid suspensions obtained in chemical process, such as titania in sulphite liquor and alumina in caustic liquor as an alternative to filtration and countercurrent washing procedures. A further application is in the desalting of pH sensitive materials, such as antibiotics obtained by fermentation, in solid suspensions which are difficult to filter.

Selective ion exchange resins may also be used in two or more contactors to selectively remove two or more species of ion from a solution or suspension.

I claim:

1. A process for the treatment of a liquid stream comprising:
   continually passing at least two different reagents respectively through at least a first and second contactor of the type having a drum, through which phases within the contactor pass, a rotor within the drum including a plurality of axially spaced discs dividing the drum interior into a series of compartments, the edges of the discs being spaced from the drun to allow passage of the phases from compartment to compartment and, for each of at least some of the compartments, a plurality of receptacles arranged to rotate with the rotor and designed to receive material of one phase and to discharge it into the other phase as the rotor turns; and
   passing the liquid stream along a flow path which includes in succession parts of one of the contactors and parts of the other contactor or contactors, whereby the liquid stream is brought into contact with the reagents successively and in rotation.

2. The process of claim 1, wherein said phases include a lighter phase and a heavier phase, the lighter phase in the contactors comprises the reagents and the heavier phase comprises the liquid stream being treated and the reagents and liquid stream flow in countercurrent through the contactors.

3. The process of claim 1, wherein said phases include a lighter phase and a heavier phase, the lighter phase in the contactors comprises the liquid stream being treated and the heavier phase comprises the reagents and the reagents and liquid stream flow co-currently through the contactor.

4. The process of claim 1, wherein the contactors are arranged with their axes parallel and the level at which the liquid stream leaves one contactor is above the level at which it enters the following contactor.

5. The process of claim 1, wherein the liquid stream enters and leaves the contactors in its flow path through openings in the walls of each contactor on that side of the interface in the contactor remote from the phase comprising the reagent.

6. The process of claim 1, wherein the liquid stream contains a mineral to be treated by at least two different reagents.

7. A process for the treatment of a liquid stream comprising:
   continually passing two different reagents respectively through a first and second contactor of the type having a drum, through which phases within the contactor pass, a rotor within the drum including a plurality of axially spaced discs dividing the drum interior into a series of compartments, the edges of the discs being spaced from the drum to allow passage of the phases from compartment to compartment and, for each of at least some of the compartments, a plurality of receptacles arranged to rotate with the rotor and designed to receive materials of one phase and to discharge it into the other phase as the rotor turns; and
   passing the liquid stream along a flow path which includes alternately parts of one of the contactors and parts of the other contactor or contactors, whereby the liquid stream is brought into contact with the reagents successively and in rotation.

8. The process of claim 7, wherein the reagents are deionising agents.

9. The process of claim 8, wherein the reagents comprise an anionic deionising agent and a cationic deionising agent.

10. The process of claim 9, wherein the deionising agents are ion exchange resins.

* * * * *